United States Patent
Koike

(10) Patent No.: US 10,477,172 B2
(45) Date of Patent: Nov. 12, 2019

(54) IMAGE PROJECTION APPARATUS CAPABLE OF PREVENTING IMAGE WHICH WOULD BE HINDRANCE TO VIEWING PRINTED MATERIAL FROM BEING PROJECTED ON PRINTED MATERIAL, CONTROL METHOD THEREFOR, AND STORAGE MEDIUM

(71) Applicant: CANON KABUSHIKI KAISHA, Tokyo (JP)

(72) Inventor: Toru Koike, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/926,908

(22) Filed: Mar. 20, 2018

(65) Prior Publication Data

US 2018/0278906 A1   Sep. 27, 2018

(30) Foreign Application Priority Data

Mar. 23, 2017   (JP) .................................. 2017-057458

(51) Int. Cl.
| | |
|---|---|
| *H04N 9/31* | (2006.01) |
| *H04N 9/74* | (2006.01) |
| *G03B 21/56* | (2006.01) |
| *G06F 3/041* | (2006.01) |

(52) U.S. Cl.
CPC ........... *H04N 9/3194* (2013.01); *G03B 21/56* (2013.01); *H04N 9/3179* (2013.01); *H04N 9/74* (2013.01); *G06F 3/0416* (2013.01)

(58) Field of Classification Search
CPC ................................................... H04N 9/3194
See application file for complete search history.

(56) References Cited

U.S. PATENT DOCUMENTS

2014/0233914 A1\* 8/2014 Williams ............. G11B 27/031
  386/280
2015/0373283 A1\* 12/2015 Hayashi ............. G06K 9/00355
  348/239

FOREIGN PATENT DOCUMENTS

| JP | 2006-003426 A | 1/2006 |
|---|---|---|
| JP | 2008-083180 A | 4/2008 |

\* cited by examiner

*Primary Examiner* — Jefferey F Harold
*Assistant Examiner* — Justin B Sanders
(74) *Attorney, Agent, or Firm* — Cowan, Liebowitz & Latman, P.C.

(57) ABSTRACT

An image projection apparatus which is capable of preventing an image which would be a hindrance to viewing printed material from being projected on the printed material. Based on input image data, a projection unit projects a projected image. Whether or not the printed material is placed on a screen at a projection destination of light projected by the projection unit is determined. The projection unit is controlled based on a result of the determination.

15 Claims, 6 Drawing Sheets

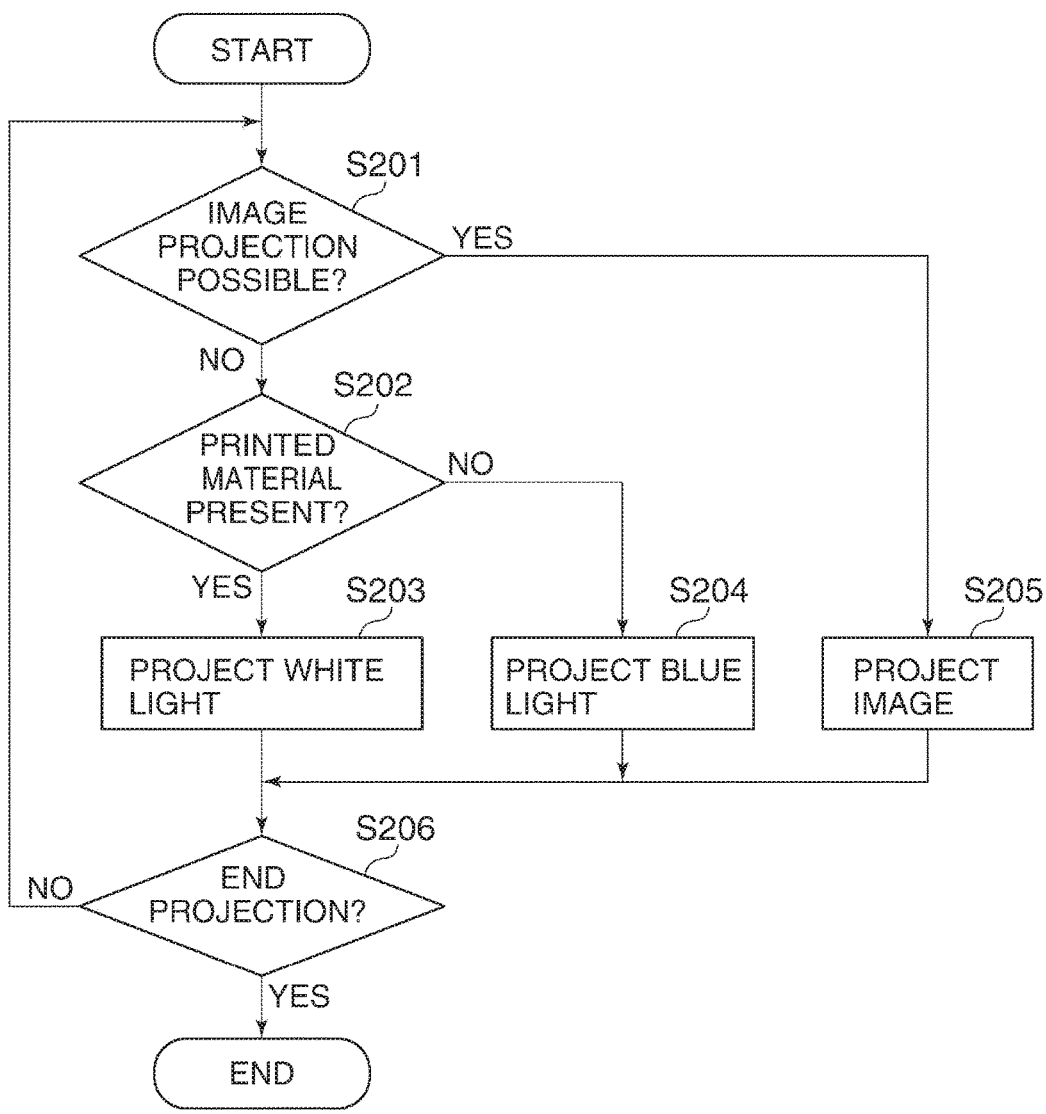

PRINTED MATERIAL ON WALL

PROJECTED IMAGE

PROJECTED IMAGE

PROJECTED
IMAGE

PROJECTED
IMAGE

IMAGE PROJECTION APPARATUS CAPABLE OF PREVENTING IMAGE WHICH WOULD BE HINDRANCE TO VIEWING PRINTED MATERIAL FROM BEING PROJECTED ON PRINTED MATERIAL, CONTROL METHOD THEREFOR, AND STORAGE MEDIUM

BACKGROUND OF THE INVENTION

Field of the Invention

The present invention relates to an image projection apparatus, a control method therefor, and a storage medium.

Description of the Related Art

High dynamic range images (hereafter referred to as "HDR images") with high dynamic range has high expressive power in terms of color, gradations, textures, and so forth, and hence they are used in various scenes in increasing opportunities. Accordingly, various techniques to regenerate images taken by digital cameras and the like as HDR images have been proposed. For example, with the aim of extending the dynamic range of luminance and color gamut, there has been proposed a technique that forms an image to be observed (hereafter referred to as a "superimposed image") with contrast improved by projecting a predetermined image onto printed material by means of an image projection apparatus (projector) (see, for example, Japanese Laid-Open Patent Publication (Kokai) No. 2008-83180). On the other hand, there has also been proposed a technique that projects blue or white light in a case where no image data on an image for use in projection has been input to the image projection apparatus (see, for example, Japanese Laid-Open Patent Publication (Kokai) No. 2006-3426).

The technique described in Japanese Laid-Open Patent Publication (Kokai) No. 2008-83180, however, has a problem that in a case where the image projection apparatus has no image data on an image for use in projection when an image is to be projected onto the printed material, an image unrelated to the printed material is projected, and therefore, desired contrast cannot be achieved. The technique described in Japanese Laid-Open Patent Publication (Kokai) No. 2006-3426 also has a problem that when it is detected that image data for use in projection has not been input to the image projection apparatus, blue light that indicates occurrence of an abnormal condition is projected, and this would be a hindrance to viewing the printed material.

SUMMARY OF THE INVENTION

The present invention provides an image projection apparatus which is capable of preventing an image which would be a hindrance to viewing printed material from being projected on the printed material, a control method therefor, and a storage medium.

Accordingly, the present invention provides an image projection apparatus comprising a projection unit configured to project a projected image based on input image data on a screen, a first determining unit configured to determine whether or not printed material is placed on the screen at a projection destination of light projected by the projection unit, and a control unit configured to control the projection unit based on a result of a determination by the first determining unit.

According to the present invention, an image which would be a hindrance to viewing printed material is prevented from being projected on the printed material.

Further features of the present invention will become apparent from the following description of exemplary embodiments (with reference to the attached drawings).

BRIEF DESCRIPTION OF THE DRAWINGS

FIG. 2 is a flowchart useful in explaining how projection is controlled by the image projection apparatus in FIG. 1.

DESCRIPTION OF THE EMBODIMENTS

Embodiments of the present invention will now be described in detail with reference to the accompanying drawings.

Figure 1:
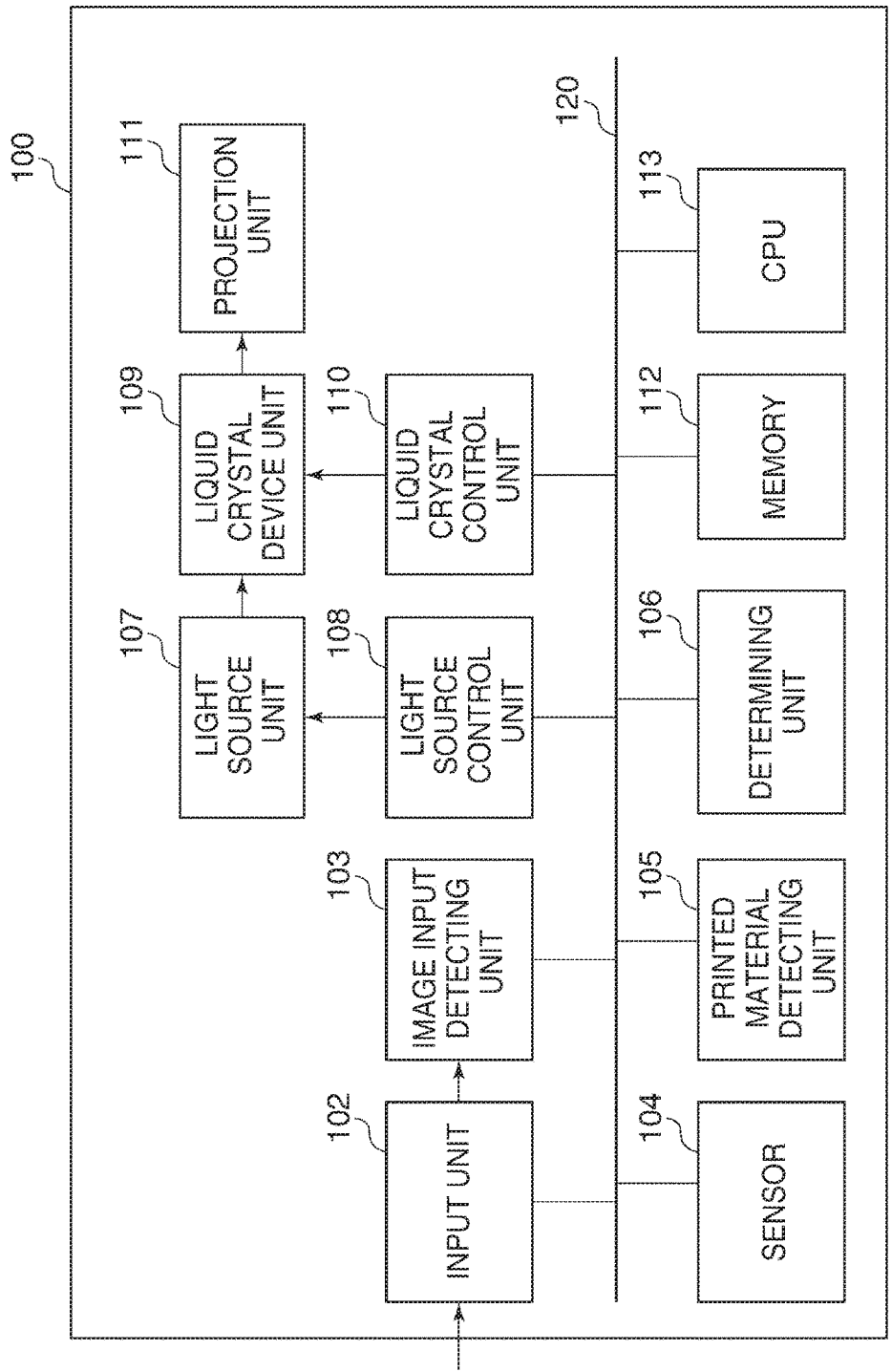
FIG. 1 is a block diagram schematically showing an arrangement of an image projection apparatus according to a first embodiment of the present invention.

FIG. 1 is a block diagram schematically showing an arrangement of as image projection apparatus 100 according to a first embodiment of the present invention. The image projection apparatus 100 has an input unit 102, an image input detecting unit 103, a sensor 104, a printed material detecting unit 105, a determining unit 106, a light source unit 107, and a light source control unit 108. The image projection apparatus 100 also has a liquid crystal device unit 109, a liquid crystal control unit 110, a projection unit 111, a memory 112, a CPU 113, and a data bus 120.

The input unit 102 receives image data (image signals) sent from external devices such as a personal computer (PC), a smart phone, and a digital camera, not shown. The image data may be either image data on a still image or image data on frames (images) constituting a video signal (moving images). The image data obtained by the input unit 102 is temporarily stored in the memory 112. The input unit 102 is capable of obtaining image data from a database (such as a server) on a network, not shown, to which the image projection apparatus 100 is connected. Further, the input unit 102 is capable of obtaining image data stored in a memory card, a hard disk, and the like, not shown.

The image input detecting unit 103 detects the presence or absence of an image input to the input unit 102 and notifies the determining unit 106 and the CPU 113 of the detection result. The sensor 104 is an image sensor (camera) which shoots a destination of projection by the projection unit 111, and captures an image. Image data generated from the image captured by the sensor 104 is stored in the memory 112.

By subjecting as image captured by the sensor 104 to image processing, the printed material detecting unit 105 determines whether or not printed material, which is a target for projection, is placed at a destination of projection by the projection unit 111. For example, a user shoots in advance a placement destination such as a wall surface on which the printed material is to be placed (posted) and registers an image captured by shooting (hereafter referred to as "the image B") in the memory 112. The printed material detecting unit 105 then calculates a value of correlation between the image B and an image obtained by the sensor 104 shooting a destination of light projected from the projection unit 111 (hereafter referred to as "the image A"). For example, to calculate the value of correlation, the printed material detecting unit 105 calculates absolute values of differences (hereafter referred to as "SAD") between pixels of the image A and the image B. A value of SAD between the image A and the image B is calculated according to an equation 1 below, where X [pixels] represents the width of the image, and Y [pixels] represents the height of the image.
[Mathematical Expression 1]

$$SAD = \Sigma_{y=0}^{Y} \Sigma_{x=0}^{X} \|A(x,y) - B(x,y)\| \quad \text{Equation 1}$$

In the above equation 1, A(x, y) and B(x, y) represent luminance values of pixels at coordinates (x, y) of the images A and B, respectively. The smaller the value of SAD between the images A and B calculated. according to the above equation 1, the higher the correlation between the images A and B (between the two images compared with each other). Conversely, the greater the value of SAD between the images A and B calculated according to the above equation 1, the lower the correlation between the images A and B. Accordingly, when the value of SAD is equal to or greater than a threshold value determined in advance, the CPU 113 determines that the printed material is placed at the destination of projection from the projection unit 111, and when the value of SAD is smaller than the threshold value, the CPU 113 determines that the printed material is not placed at the destination of projection from the projection unit 111. The printed material detecting unit 105 thus ascertains whether the printed material is present or absent at the destination of projection from the projection unit 111. It should be noted that a correlation between an image formed on the printed material and the image B may be determined by obtaining the value of SAD.

It should be noted that in a case where a variety of images are stored in the memory 112 during manufacturing of the image projection apparatus 100 (at the time of shipment), a wall surface or the like on which the printed material is to be placed does not always have to be shot in advance. For example, the user may designate an image regarded as a destination of projection from the projection unit 111, depending on a condition (mode) of a projection destination of light from the projection unit 111. In this case, however, in order to determine a correlation between an image registered at the time of shipment and am image of the projection destination shot by the sensor 104, their image sizes need to be made equal.

The determining unit 106 determines whether or not projection of an image designated in advance as an image to be projected onto the printed material (hereafter referred to a "projected image") is possible. For example, when the image input detecting unit 103 detects that input of image data to the input unit 102 stops during projection based on image data on the projected image, the determining unit 106 determines that the projection has become impossible. Specifically, when network communication stops when an image obtained from a network connected to the input unit 102 is being displayed and communication has become impossible, the determining unit 106 determines that the projection has become impossible. Also, when input of image data stops due to, for example, removal of a storage medium connected to the input unit 102 when an image obtained from the storage medium is being displayed, the determining unit 106 determines that the projection has become impossible. When the printed material is not placed at a predetermined position or when the printed material on which an image different from the projected image is formed is placed, the determining unit 106 also determines that the projection has become impossible. Further, when image data on the projected image is absent in the memory 112, the determining unit 106 determines that the projection is impossible. The determining unit 106 notifies the CPU 113 of the judgment result.

The light source unit 107 is a laser, an LED, a halogen lamp, a xenon lamp, a high-pressure mercury lamp, or the like and outputs light for use in projection by the projection unit 111. The light source control unit 108 controls turning on-off and brightness of the light source unit 107. The liquid crystal device unit 109 has one liquid crystal panel for each of red (R), green (G), and blue (B) color components. Based on image data input from the memory 112, the liquid crystal control unit 110 controls voltage applied to pixels (R pixels, G pixels, and B pixels) of the liquid crystal device unit 109 to adjust reflectance and transmittance on a pixel-by-pixel basis. The projection unit 111, which is comprised of, for example, a dichroic mirror or a prism, combines R, G, and B beams that have passed through the respective RGB liquid crystal panels constituting the liquid crystal device unit 109. The projection unit 111 externally radiates the combined beams through a projection optical system, not shown, comprised of a lens or the like, and as a result, an image read from the memory 112 is projected onto a predetermined position on a screen (a wall). At this time, the liquid crystal device unit 109 is controlled by the liquid crystal control unit 110 so as to have light transmittance corresponding to the image read from the memory 112.

The CPU 113 integrally controls operation of the image projection apparatus 100 by executing predetermined programs stored in the memory 112 to control operation of the components of the image projection apparatus 100. The memory 112 stores image data, programs which are executed by the CPU 113, and so forth. The data bus 120 connects the components constituting the image projection apparatus 100 with one another so that they can communicate with one another. It should be noted that the image input detecting unit 103, the printed material detecting unit 105, the determining unit 106, the light source control unit 108, and the liquid crystal control unit 110 may be each implemented either by software (programs) or by hardware. Each of these components may also be implemented by a combination of software and hardware or may be comprised of a microcomputer or an arithmetic device such as an ASIC.

The image projection apparatus 100 is controlled by the CPU 113 so as to switch modes of projection from the projection unit 111 according to whether or riot printed material is present on the screen at a projection destination and whether or not projection of an image from the projection unit 111 is possible. FIG. 2 is a flowchart useful in explaining how projection is controlled by the image projection apparatus 100. Here, it is assumed that a position at which printed material is placed and a position at which an image from the image projection apparatus 100 is projected are aligned in advance. Processes in the flowchart of FIG. 2 are implemented by the CPU 113 of the image projection apparatus 100 executing predetermined programs stored in the memory 112 to control operation of the components constituting the image projection apparatus 100.

In step S201, based on a result of judgment by the determining unit 106, the CPU 113 determines whether or not projection of a projected image is possible. It should be noted that the criterion for judgment by the determining unit 106 as to whether the projection is possible or impossible has already been described, and therefore, description is omitted here. When the CPU 113 determines that the projection of the projected image is possible (YES in step S201), the process proceeds to step S205, and when the CPU 113 determines that projection of the projected image is impossible (NO in the step S201), the process proceeds to step S202.

In the step S202, based on a result of detection by the printed material detecting unit 105, the CPU 113 determines whether or not printed material is placed on the screen at a projection destination. When the CPU 113 determines that the printed material detecting unit 105 has detected printed material (YES in the step S202), the process proceeds to step S203, and when the CPU 113 determines that the printed material detecting unit 105 has detected no printed material (NO in the step S202), the process proceeds to step S204.

In the step S203, the CPU 113 projects white light from the projection unit 111 onto the printed material, thus widening a dynamic range of the printed material. It should be noted that the white light means light in which visible light of blue (shorter wavelengths) to red (longer wavelengths) wavelengths is substantially uniformly mixed. In the step S201, the CPU 113 determines that an abnormal condition that makes the projection impossible occurs, and then projects blue light from the projection unit 111 onto the whole surface of the projection destination. As a result, the user knows that an abnormal condition occurs in the image projection apparatus 100. In the step S205, the CPU 113 projects the projected image stored in the memory 112 onto the printed material, and this forms a superimposed image (image to be observed) that is the printed material with its dynamic range widened.

After the steps S203, S204, and S205, the CPU 113 determines in step S206 whether or not to end the projection. For example, when the user has instructed the CPU 113 to end the projection by operating an operating means, not shown, provided in the image projection apparatus 100, the CPU 113 ends the projection. Upon judging that it has been instructed to end the projection (Yes in the step S206), the CPU 113 ends the present process, and when the CPU 113 determines that it has not been instructed to end the projection (NO in the step S206), the process returns to the step S201.

Figure 3A:
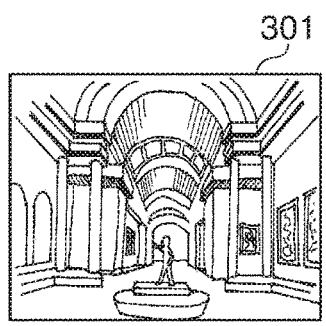
FIGS. 3A to 3D are views showing examples of images projected by the image projection apparatus in FIG. 1 and destinations onto which images are projected by the image projection apparatus in FIG. 1.
Figure 3B:
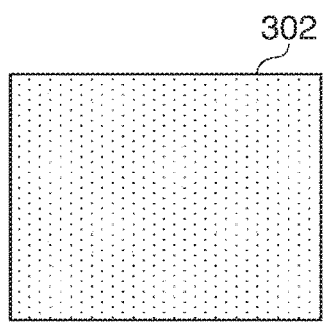
Figure 3C:
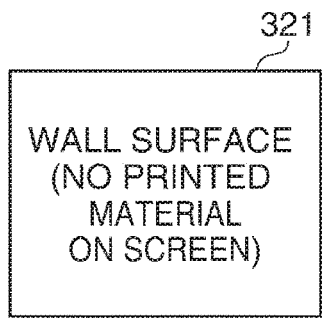
Figure 3D:
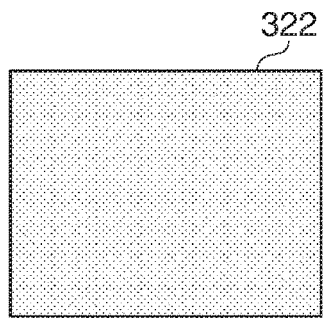

A description will now be given of concrete examples of the process carried out in accordance with the flowchart of FIG. 2. FIGS. 3A to 3D are views showing examples of a projected image and a projection destination, FIGS. 3A and 3B showing the first example, and FIGS. 3C and 3D showing the second example.

In the first example, it is assumed that no image data has been input to the input unit 102. In this case, the judgment result in the step S201 is negative (NO). FIG. 3A shows printed material 301 placed on the screen at a projection destination. Since the printed material 301 is placed at the projection destination, the judgment result in the step S202 is positive (YES), and as a result, white light is projected onto the printed material 301 in the step S203. FIG. 3B schematically shows a white projected image 302 that is to be projected onto the printed material 301. The CPU 113 controls the liquid crystal device unit 109 via the liquid crystal control unit 110 such that the white projected image 302 is projected onto the printed material 301.

In the second example, it is assumed that no image data has been input to the input unit 102 as with the first example. In this case, the judgment result in the step S201 is negative (NO). FIG. 3C schematically shows a state in which no printed material is placed on the screen at a projection destination. Here, a situation in which a wall surface 321 (a wall surface or the like on which the printed material 301 is to be placed) is the projection destination is taken up as an example. Since no printed material being placed at the projection destination, the judgment result in the step S202 is negative (NO), and as a result, blue light is projected onto the wall surface 321 in the step S204. FIG. 3D schematically shows a blue projected image 302 that is to be projected onto the wall surface 321. The CPU 113 controls the liquid crystal device unit 109 via the liquid crystal control unit 110 such that the blue projected image 322 is projected onto the wall surface 321.

As described above, in the present embodiment, as long as predetermined printed material is placed at the projection destination, white light is projected onto the printed material without canceling projection or without projecting blue light even if no image data on an image to be projected onto the printed material has been input, and this improves contrast of the printed material. Thus, an image that would be a hindrance to viewing the printed material is prevented from being projected onto the printed material even though the printed material is placed at the projection destination.

Figure 4:
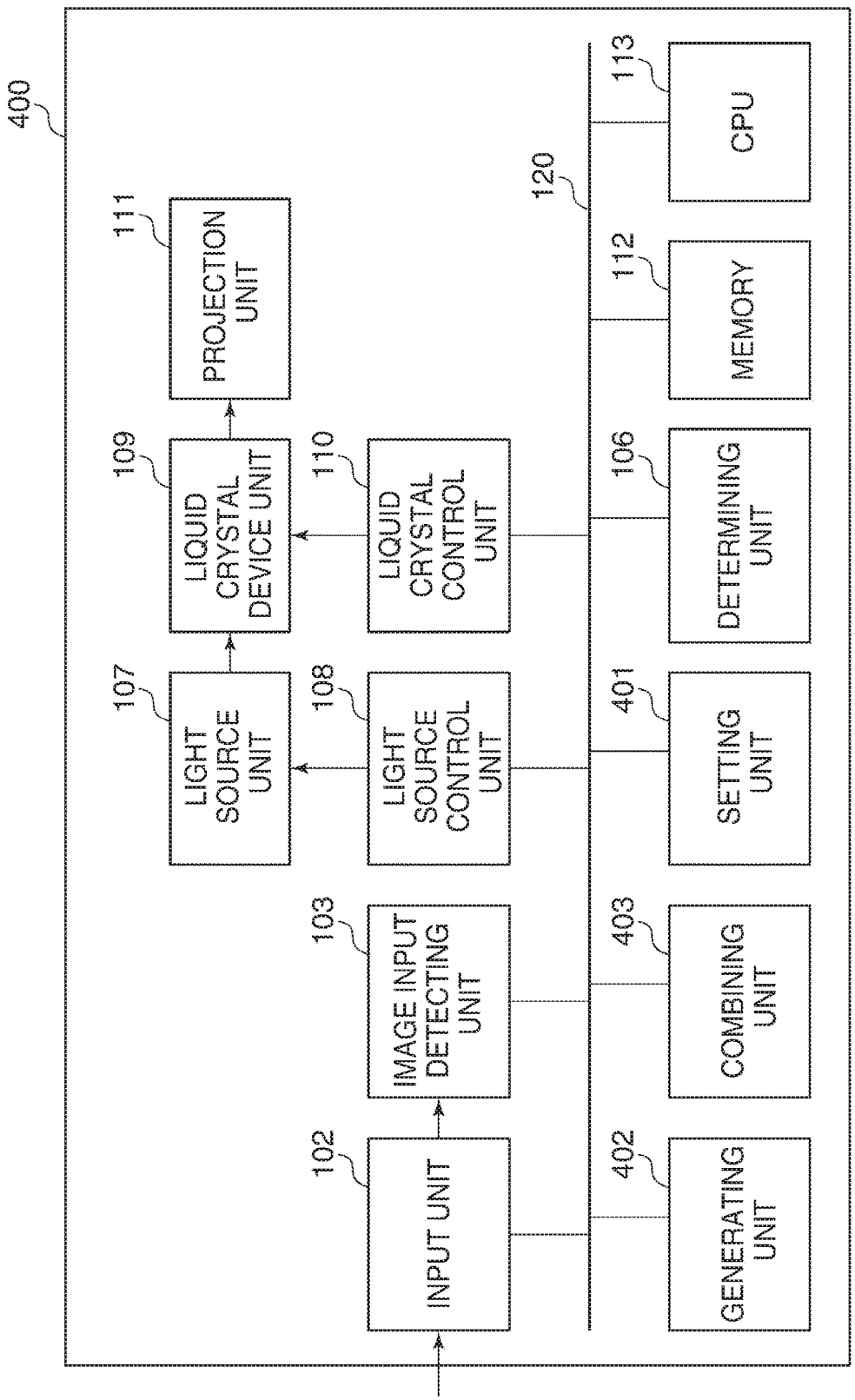
FIG. 4 is a block diagram schematically showing an image projection apparatus according to a second embodiment of the present invention.

FIG. 4 is a block diagram schematically showing an arrangement of an image projection apparatus 400 according to a second embodiment of the present invention. Component elements of the image projection apparatus 400 which are the same as those of the image projection apparatus 100 are designated by the same reference symbols, detailed description of which, therefore, is omitted. The image projection apparatus 400 has an input unit 102, an image input detecting unit 103, a determining unit 106, a light source unit 107, a light source control unit 108, a liquid crystal device unit 109, a liquid crystal control unit 110, a projection unit 111, a memory 112, a CPU 113, and a data bus 120. The image projection apparatus 400 also has a setting unit 401, a generating unit 402, and a combining unit 403.

The setting unit 401 sets projection modes. Here, there are two projection modes consisting of a normal projection mode and a printed material projection mode. In the normal projection mode, no consideration is given to a projection destination. The printed material projection mode aims to project a projected image onto printed material placed on the screen at a projection destination. A detailed description will be given later of how the image projection apparatus 400 works in the printed material projection mode.

The generating unit 402 generates graphics (images) for displaying an operating menu for the image projection apparatus 400, selectively displaying input signals, displaying a description of an image formed on printed material on the screen at a projection destination, displaying a warning, and displaying other things. The CPU 113 stores the graphics generated by the generating unit 402 in the memory 112. Based on an instruction from the CPU 113, the combining unit 403 combines projection data with the graphics generated by the generating unit 402 and stored in the memory 112 to generate a composite image. The projection data may be any of the following: image data on an image to be projected onto printed material, image data on a white fixed color image (image for projecting white light onto the whole surface), and image data on a blue fixed color image (image for projecting white blue onto the whole surface). The CPU 113 stores the composite image obtained by the combining unit 403 in the memory 112.

In the first embodiment described earlier, the projection modes are switched according to the presence or absence of image data on an image to be projected onto printed material and the presence or absence of printed material on the screen at a projection destination. On the other hand, in the present embodiment, the projection modes are switched according to the presence or absence of image data on an image to be projected onto printed material and a projection mode set for the image projection apparatus 400.

Figure 5:
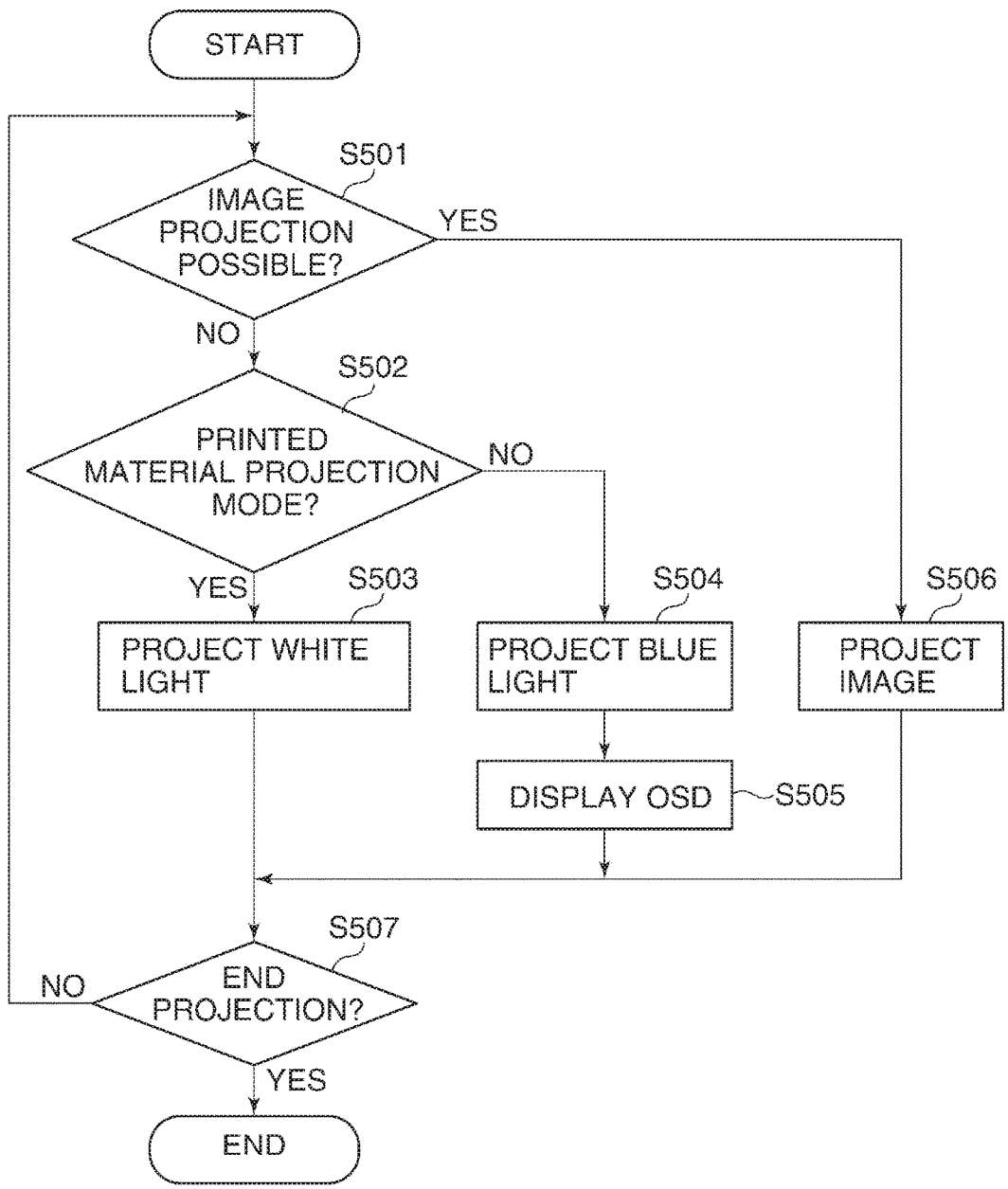
FIG. 5 is a flowchart useful in explaining how projection is controlled by the image projection apparatus in FIG. 4.

FIG. 5 is a flowchart describing how projection is controlled by the image projection apparatus 400. Here, the image projection apparatus 400 is configured to project no composite image when it is placed in the printed material projection mode. Thus, the image projection apparatus 400 is allowed to project only a composite image obtained by combining graphics with the blue fixed color image as will be described later. Processes in the flowchart of FIG. 5 are implemented by the CPU 113 executing predetermined programs stored in the memory 112 to control operation of the components constituting the image projection apparatus 400. It should be noted that processes in the flowchart FIG. 5 which are the same as those in the flowchart of FIG. 2 will be briefly explained by noting as such.

In step S501, based on a result of judgment by the determining unit 106, the CPU 113 determines whether or not projection of a projected image onto printed material is possible. In the judgment in the step S501, whether the normal projection mode or the printed material projection mode is set as the projection mode does not matter. Here, the image projection apparatus 400 does not ascertain whether or not printed material is placed, and hence the determining unit 106 determines that the projection is possible as long as image data on the projected image is stored in the memory 112. It should be noted that when an error that makes the projection of the projected image impossible occurs in the image projection apparatus 400 even though the image data on the projected image is stored in the memory 112, the determining unit 106 determines that projection is impossible. Examples of the error occurring in the image projection apparatus 400 include an image data formatting error.

When the determining unit 106 determines that the projection is possible (YES in the step S501), the CPU 113 proceeds to step S506. In the step S506, the CPU 113 projects the projected image from the projection unit 111 as with the process in the step S205, and after that, the process proceeds to step S507.

When the determining unit 106 determines that the projection is impossible (NO in the step S501), the process proceeds to step S502. In the step S502, the CPU 113 determines whether or not the printed material projection mode is set as the projection mode. The projection mode is set by the user, and it is assumed that when the printed material projection mode is not set, the normal projection mode is set. When the CPU 113 determines that the printed material projection mode is set (YES in the step S502), the process proceeds to step S503, and when the CPU 113 determines that the normal projection mode is set (NO in the step S502), the process proceeds to step S504. It should be noted that when the process proceeds to the step S504, the CPU 113 causes the generating unit 402 to generate graphics for notifying the user of the reason why the projection is impossible (for example, there is no image data on a projected image) and stores the generated graphics in the memory 112.

In the step S503, the CPU 113 reads out the white fixed color image stored in the memory 112 at the time of shipment and projects white light from the projection unit 111 onto the whole surface by controlling the liquid crystal control unit 110. It should be noted that in many cases, the printed material projection mode is set based on the precondition that printed material is placed or has been placed at a predetermined position, and hence in the step S503, white light is projected onto printed material in many instances. Projected white light mixed with graphics tends to be a hindrance to viewing the printed material, and hence in the present embodiment, the combining unit 403 does not combine graphics with an image for projecting white light. After the step S503, the CPU 113 proceeds to step S507.

In the step S504, the CPU 113 reads out the blue fixed color image, which is stored in the memory 112 at the time of shipment, and projects blue light from the projection unit 111 onto the whole surface by controlling the liquid crystal control unit 110. Then, in the next step S505, first, the CPU 113 causes the combining unit 403 to combine the graphics, which were stored in the memory 112 when the judgment result in the step S502 was negative (NO), with the blue fixed color image to generate a composite image. Then, in the step S505, the CPU 113 projects the generated composite image. As a result, the graphics are displayed as an OSD on the blue screen. Examples of the OSD displayed on the blue screen include a notification indicating that there is no image data on a projected image, and a notification indicating that an error occurs in the image projection apparatus 400. After the step S505, the CPU 113 proceeds to the step S507.

The process in the step S507 is the same as the process in the step S206, in which the CPU 113 determines whether or not to end the projection. When the CPU 113 determines that it has been instructed to end the projection (YES in the step S507), the present process is ended, and when the CPU 113 determines that it has not been instructed to end the projection (NO in the step S507), the process returns to the step S501.

Figure 6A:
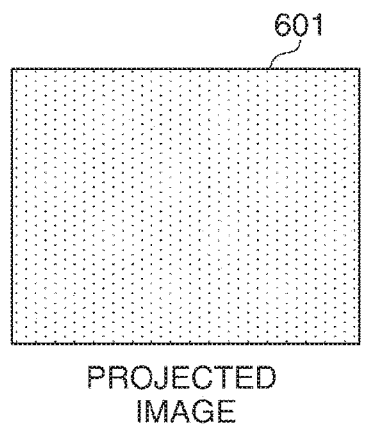
FIGS. 6A and 6B are views showing examples of images projected by the image projection apparatus in FIG. 4.
Figure 6B:
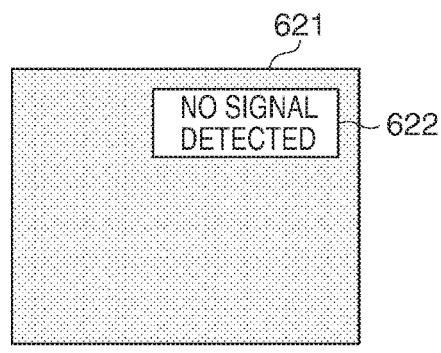

A description will be given of concrete examples of the process carried out in accordance with the flowchart of FIG. 5. FIG. 6A is a view schematically showing a white projected image 601 projected in the step S503. In the step S503, the white projected image 601 is projected when the printed material projection mode is set although the projection is impossible, and therefore, it does not matter whether or not printed material is placed on the screen at a projection destination. Moreover, no OSD is displayed since the printed material projection mode is set. FIG. 6B is a view schematically showing a composite image projected in the steps S504 and S505. In this example, graphics saying "no signal detected" indicating the absence of image data on a projected image is combined with a blue projected image 621, but the graphics to be displayed are not limited to them.

In the present embodiment, when white light is to be projected in the printed material projection mode, a composite image obtained from graphics is not projected, but alternatively, a composite image in which graphics are placed at such a position as not to overlap an image formed on printed material may be projected. Examples of graphics to be combined with an image onto which white light is projected include an explanation about the printed material. In this case, at the time of projection, graphics may be caused to show up outside the printed material by adjusting a zoom rate of a lens, not shown, which the projection unit 111 has. Likewise, although in the embodiment described above, graphics are combined with the inside of the blue projected image 621 (FIG. 6B), a composite image may be generated such that graphics are displayed outside the blue projected image 621.

As described above, according to the present embodiment, even in a case where there is no image data on a projected image, white light is projected as long as the printed material projection mode is set. As a result, in a case where printed material is placed, a dynamic range of the printed material is widened. Even in a case where image projection onto printed material becomes impossible although a projected image has been normally projected onto the printed material, white light is projected as long as the printed material projection mode is set, enabling the user to continue viewing the printed material. On the other hand, when image projection onto printed material becomes impossible although a projected image has been normally projected onto the printed material, an OSD is displayed on a blue background as long as the normal projection mode is set, and this immediately informs the user of the occurrence of an abnormal condition.

It should be noted that although in the embodiments described above, blue light which is an example of chromatic light is projected by the projection unit 111 in the steps S204 and S504, this is not limitative, but light in a chromatic color such as red, green, brown, dark red, violet, or navy blue may be projected. Moreover, the embodiments described above are merely illustrative embodiments of the present invention, and the embodiments may be used in combination as appropriate. For example, the image projection apparatus 100 may be equipped with the generating unit 402 and the combining unit 403 to generate graphics for displaying a warning or the like, and when blue light is projected, the graphics may also be projected as an OSD at the same time.

Other Embodiments

Embodiment (s)) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-057458, filed Mar. 23, 2017 which is hereby incorporated by reference herein in its entirety.

What is claimed is:

1. An image projection apparatus comprising:
a projection unit configured to project an image on a screen; and
at least one processor and/or at least one circuit that performs operation of following units:
a first determining unit configured to determine whether or not printed material is placed on the screen;
a second determining unit configured to determine whether or not target image data corresponding to the printed material is stored in a storage device; and
a control unit configured to control the projection unit, wherein
in a case where the printed material is placed on the screen and the target image data is stored in the storage device, the control unit controls the projection unit to project an image based on the target image data, and
in a case where the printed material is placed on the screen and the target image data is not stored in the storage device, the control unit controls the projection unit to project a white image on the printed material.

2. The image projection apparatus according to claim 1, wherein
in a case where the printed material is not placed on the screen, the control unit controls the projection unit such that a color image, a color of which is chromatic color, is projected on the screen.

3. The image projection apparatus according to claim 2, wherein
the at least one processor and/or the at least one circuit further performs an operation of an image capture unit configured to shoot the screen at the projection destination and obtain captured image, and
wherein in a case where there is a high correlation between an image obtained by shooting a placement destination of the printed material and the captured image obtained by the image capture unit shooting the screen at the projection destination of the image projected by the projection unit, the first determining unit determines that no printed material is placed on the screen at the projection destination.

4. The image projection apparatus according, to claim 1, further comprising the storage device.

5. The image projection apparatus according to claim 1, wherein
the at least one processor and/or the at least one circuit further performs operations of following units:
a generating unit configured to generate predetermined graphics; and
a combining unit configured to generate a composite image by combining the graphics generated by the generating unit with projection data for use in projection from the projection unit.

6. The image projection apparatus according to claim 1, wherein in a case where the printed material is not placed on the screen, the control unit controls the projection unit such that a blue image is projected as the color image.

7. An image projection apparatus comprising:
a projection unit configured to project an image onto a printed material on a screen, and
at least one processor and/or at least one circuit that performs operations of following units:
an obtaining unit configured to obtain target image data corresponding to the printed material on the screen from a storage device configured to store image data on an image to be projected onto the printed material; and
a control unit configured to control the projection based on whether or not the obtaining unit obtains the target image data, wherein
in a case where the obtaining unit obtains the target image data, the control unit controls the projection unit to project an image based on the target image data, onto the printed material on the screen.

8. The image projection apparatus according to claim 7, wherein
the at least one processor and/or the at least one circuit further performs an operation of a setting unit configured to set a first projection mode or a second projection mode as a mode of projection by the projection unit,
in a case where the first projection mode is set and the obtaining unit does not obtain the target image data, the control unit controls the projection unit to project a first image, a color of which is chromatic color, on the screen,
in a case where the second projection mode is set and the obtaining unit does not obtain the target image data, the control unit controls the projection unit to project a second image, a color of which is white, with white light onto the printed material on the screen, and
in a case where the second projection mode is set and the obtaining unit obtains the image data, the control unit controls the projection unit to project an image based on the target image data, onto the printed material on the screen.

9. The image projection apparatus according to claim 7, wherein
the at least one processor and/or the at least one circuit further performs operations of following units:
a generating unit configured to generate predetermined graphics; and
a combining unit configured to generate a composite image by combining the graphics generated by the generating unit with projection data for use in projection from the projection unit, and
wherein the control unit controls the projection unit to project the composite image.

10. The image projection apparatus according to claim 8, wherein the chromatic color is blue.

11. A control method for an image projection apparatus having a projection unit configured to project an image on a screen, the control method comprising:
determining whether or not printed material is placed on the screen;
determining whether or not target image data corresponding to the printed material is stored in a storage device; and
controlling the projection unit, wherein
in a case where the printed material is placed on the screen and the target image data is stored in the storage device, the projection unit is controlled to project an image based on the target image data, and
in a case where the printed material is placed on the screen and the target image data is not stored in the storage device, the projection unit is controlled to project a white image on the printed material.

12. A control method for an image projection apparatus having a projection unit configured to project an image onto a printed material on a screen, the control method comprising:
obtaining target image data corresponding to the printed material on the screen from a storage device configured to store image data on an image to be projected onto the printed material; and
controlling the projection unit based on whether or not the target image data is obtained, wherein
in a case where the target image data is obtained, the projection unit controlled to project an image based on the target image data, onto the printed material off the screen.

13. A non-transitory computer-readable storage medium storing a program for causing a computer to execute a control method for an image projection apparatus having a projection unit configured to project an image on a screen, the control method comprising:
determining whether or not printed material is placed on the screen;
determining whether or not target image data corresponding to the printed material is stored in a storage device; and
controlling the projection unit, wherein
in a case where the printed material is placed on the screen and the target image data is stored in the storage device, the projection unit is controlled to project an image based on the target image data, and
in a case where the printed material is placed on the screen and the target image data is not stored in the storage device, the projection unit is controlled to project a white image on the printed material.

14. A non-transitory computer-readable storage medium storing a program for causing a computer to execute a control method for an image projection apparatus having a projection unit configured to project an image onto a printed material on a screen, the control method comprising:
obtaining target image data corresponding to the printed material on the screen from a storage device configured to store image data on an image to be projected onto the printed material; and
controlling the projection unit based on whether or not the obtaining unit obtains the target image data, wherein
in a case where the target image data is obtained, the projection unit is controlled to project an image based on the target image data, onto the printed material on the screen.

15. The image projection apparatus according to claim 7, wherein
in a case where the obtaining unit does not obtain the target image data, the control unit controls the projection unit to project a predetermined image on the screen.

* * * * *